United States Patent
Saitoh

(10) Patent No.: US 7,488,237 B2
(45) Date of Patent: Feb. 10, 2009

(54) OPTICAL FILTER, PRODUCTION METHOD FOR THIS OPTICAL FILTER AND OPTICAL DEVICE USING THIS OPTICAL FILTER AND HOUSING STRUCTURE FOR THIS OPTICAL FILTER

(75) Inventor: Hideshi Saitoh, Kakogawa (JP)

(73) Assignee: Daishinku Corporation, Hyogo (JP)

( * ) Notice: Subject to any disclaimer, the term of this patent is extended or adjusted under 35 U.S.C. 154(b) by 149 days.

(21) Appl. No.: 10/496,111

(22) PCT Filed: Nov. 21, 2002

(86) PCT No.: PCT/JP02/12209

§ 371 (c)(1),
(2), (4) Date: May 20, 2004

(87) PCT Pub. No.: WO03/044573

PCT Pub. Date: May 30, 2003

(65) Prior Publication Data

US 2005/0013025 A1   Jan. 20, 2005

(30) Foreign Application Priority Data

Nov. 21, 2001  (JP)  .............................. 2001-356550

(51) Int. Cl.
*B24B 1/00* (2006.01)

(52) U.S. Cl. .............................. 451/44; 65/31; 359/498; 359/891

(58) Field of Classification Search .................... 451/41, 451/44; 348/340, 342; 250/208.1; 257/215, 257/226; 385/65, 88, 134, 137, 129, 52; 65/31, 30.13; 359/498, 891

See application file for complete search history.

(56) References Cited

U.S. PATENT DOCUMENTS

| | | | | |
|---|---|---|---|---|
| 4,911,743 A | * | 3/1990 | Bagby | .............................. 65/31 |
| 5,040,880 A | * | 8/1991 | Morimoto et al. | ........... 359/498 |
| 5,719,832 A | * | 2/1998 | Kataoka et al. | ................ 369/14 |
| 6,400,428 B1 | | 6/2002 | Izumi | |
| 6,965,134 B2 | * | 11/2005 | Mogamiya et al. | .......... 257/215 |
| 2002/0080303 A1 | | 6/2002 | Izumi | |
| 2002/0158985 A1 | * | 10/2002 | Saitoh et al. | ................ 348/340 |

FOREIGN PATENT DOCUMENTS

| | | |
|---|---|---|
| JP | 60-23801 | 2/1985 |
| JP | 4-247658 | 9/1992 |
| JP | 05-0453557 | 6/1993 |
| JP | 43557/1993 | 6/1993 |
| JP | 05138446 | * 6/1993 |
| JP | 5-326695 | 12/1993 |
| JP | 06-087921 | 12/1994 |
| JP | 2508176 | 5/1996 |
| JP | 8-338972 | 12/1996 |
| JP | 9-43542 | 2/1997 |
| JP | 10-125565 | 5/1998 |
| JP | 2000-114502 | 4/2000 |
| JP | 2000-238877 | 9/2000 |
| JP | 2000-238879 | 9/2000 |
| JP | 2001-2167 | 1/2001 |
| JP | 2001-53036 | 2/2001 |

\* cited by examiner

*Primary Examiner*—Ellen P. Morgan
(74) *Attorney, Agent, or Firm*—Wenderoth, Lind & Ponack, L.L.P.

(57) ABSTRACT

An optical low pass filter is constituted by a quartz birefringent plate a quarter wavelength plate and a quartz birefringent plate layered in that order. Curved chamfered portions are formed at a periphery of an outgoing light surface (main surface) of one of the quartz birefringent plates. A curve chamfering width of a main surface side is smaller than that of a side surface side.

10 Claims, 8 Drawing Sheets

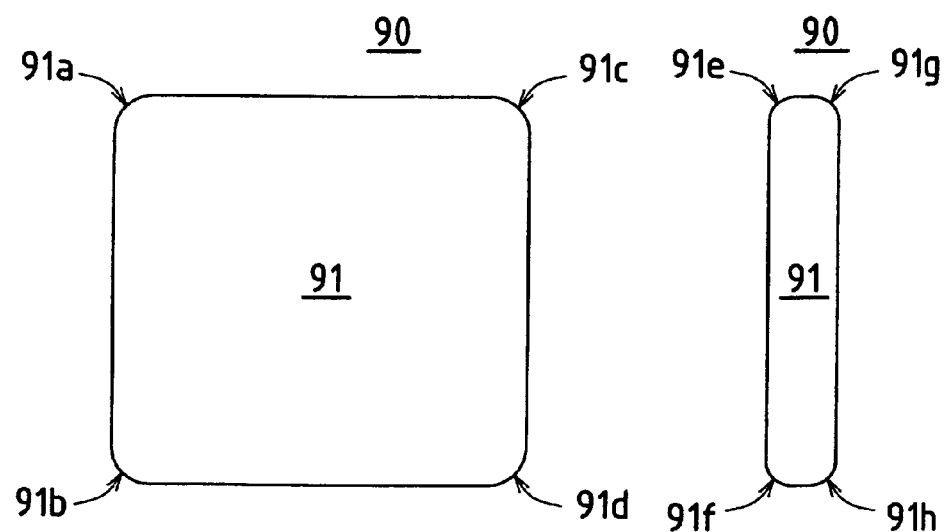
FIG.9(a)
FIG.9(b)
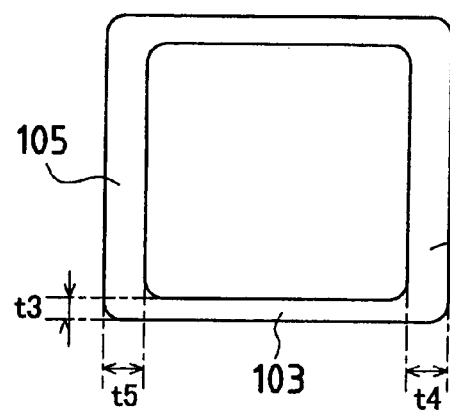
FIG.10
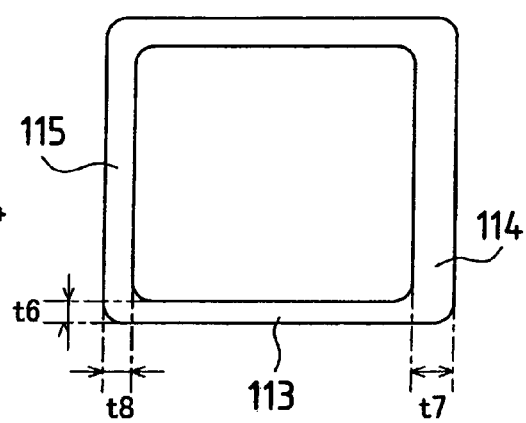
FIG.11

OPTICAL FILTER, PRODUCTION METHOD FOR THIS OPTICAL FILTER AND OPTICAL DEVICE USING THIS OPTICAL FILTER AND HOUSING STRUCTURE FOR THIS OPTICAL FILTER

TECHNICAL FIELD

The present invention relates to optical filters made of one or more optical plates, methods of manufacturing such optical filters, optical devices that use such optical filters, and storage structures for such optical filters.

BACKGROUND ART

Various optical filters such as optical low pass filters are used in image-taking devices such as video cameras and digital still cameras. Such filters perform a role of removing light of unnecessary wavelengths such as infrared light and wave-filtering optical false signals. Using an example of an optical low pass filter, commonly used configurations of such optical filters include configurations in which plates such as a quartz birefringent plate and an infrared cut glass plate are appropriately combined according to desired wave-filtering characteristics. And in recent years, depending on an application, configurations in which an optical interference film is formed on a single plate are also being used. In the case of a configuration in which a plurality of plates are combined, conventionally manufacture of such optical filters involved using an adhesive to individually laminate the optical plates to be combined, which were divided into small pieces.

However, in recent years, as shown in JP H9-43542A for example, a so-called multi-cutout manufacturing method has been proposed and implemented, which involves laminating necessary structural members according to required wave-filtering characteristics at a stage prior to cutting of the wafer into small pieces, then performing cutting to obtain individual optical filters. Reductions in manufacturing costs have been achieved with manufacturing methods such as this.

On the other hand, cut edge portions of an optical filter made with this multi-cutout manufacturing method are sharp. These edge portions are often cracked or chipped when viewed microscopically, and there is a possibility that some of the optical plates will suffer from further chipping or cracking. In this case, cracked pieces or chipped pieces may adhere to a main surface of the optical plate, which is a transmission surface for optical information, and become optical foreign substances. Such foreign substances may be picked up by image-taking elements such as a CCD and become a cause of worsened image quality during video output.

Furthermore, other members may be cut when the edge portions are sharp and such cut pieces can become optical foreign substances. For example, it is common for optical filters to be storage packed in a resin case for delivery to a customer, and edge portions can cut into an inner wall of the resin case due to looseness within the storage case, thus resulting in cut pieces adhering to a main surface of an optical plate. Configurations have been disclosed with regard to preventing such looseness, such as JP 2000-238877A, in which side surfaces of an optical filter are fixedly supported, and JP 2001-2167A, in which the optical filter is fixed with an adhesive sheet. However, optical foreign substances also can be produced by contact with a case when optical filters are taken out from the case to be moved individually.

As a countermeasure against such optical foreign substances, Japanese Utility Model No. 2508176 discloses a configuration in which chamfering that forms a linear slanted surface is performed with respect to edges formed on an optical filter. Although such a chamfered structure is not sharp, edges are still formed, and these edge portions may be affected by cracking or chipping, thus resulting in pieces being cut from a resin case as mentioned above.

And furthermore, due to continued miniaturization of image-taking devices such as video cameras, a distance between a front surface of a CCD and an optical filter positioned thereon has been becoming shorter in recent years. And in this case, optical foreign substances that have adhered to a main surface of the optical filter cause even more conspicuous image defects, leading to worsened image quality during video output.

SUMMARY OF INVENTION

The present invention has been devised in light of these technological trends, and it is an object therein to provide a high quality optical filter that can greatly suppress occurrence of optical foreign substances in optical filters and a method for manufacturing such an optical filter, as well as to provide a storage structure that can maintain a quality of the optical filter.

In order to achieve the above-mentioned object, the present invention forms fewer edges and greatly suppresses occurrence of optical foreign substances by performing curve chamfering for the optical filter, and can therefore solve these issues with the following configurations.

First, an optical filter according to the present invention is provided with one or a plurality of optical plates, wherein curve chamfering is performed on an edge of at least a side surface side of the optical filter. This curve chamfering may be performed on an edge of one main surface side of the optical filter, or may be performed on edges of both main surface sides of the optical filter, it may be performed on a side surface side and one main surface side or on a side surface side and both main surface sides.

Here, chamfering of an edge of a main surface side refers to chamfering an edge (sides enclosing a main surface) formed on a main surface side. A result of performing this chamfering is that the optical filter is ground across a main surface and a side surface. Furthermore, chamfering of an edge of a side surface refers to chamfering an edge formed between adjoining side surfaces. A result of performing this chamfering is that a side surface of the optical filter is ground.

As curve chamfering is performed on an edge of at least a side surface side of the optical filter, cracking or chipping of an optical plate that occurs conventionally is greatly suppressed, and cutting debris that occurs by contact with a case or other portions is also greatly inhibited, and occurrence of optical foreign substances as a whole is suppressed. Therefore, adherence of such optical foreign substances to a main surface of the optical filter is eliminated.

Furthermore, in a case of performing curve chamfering on only one main surface, it is easy to chamfer by preparing a form of a dicing blade to cut a wafer into individual small pieces of optical filters after the wafer has been laminated to obtain desired wave-filtering characteristics. It should be noted that, as mentioned above, the shorter the distance between the CCD and an optical foreign substance, the more conspicuous is image deterioration. Consequently, when performing curve chamfering on only one main surface, it is preferable that the main surface that is curve chamfered so as to have an effect that suppresses occurrence of optical foreign substances is set on a side of an image-taking element. It should be noted that when curve chamfering is performed on both main surfaces, there is no need to discriminate placement direction in this way.

Next, in configurations in which curve chamfering is performed on optical plates that make up an optical filter, it is required that each individual optical plate is chamfered. Such a configuration is the same as the above-mentioned curve chamfering of the optical filter.

That is to say, it is characterized by curve chamfering being performed on an edge of at least a side surface side of each optical plate. This curve chamfering may be performed on an edge of one main surface side of each optical plate, or may be performed on an edge of both main surface sides of each optical plate, or may be performed on an edge of a side surface side and one main surface side of each optical plate, or on a side surface side and both main surface sides of each optical plate.

With these configurations it is also possible to greatly suppress occurrence of optical foreign substances.

In the above configurations, in the curve chamfering of the edge of the main surface side, an amount of chamfering on a main surface side may be smaller than an amount of chamfering on a side surface side. In the present invention, "chamfering amount" refers to an amount prescribed by a predetermined chamfering width and a curvature by which an amount of a ground optical filter is defined.

With these configurations, it is also possible to greatly reduce occurrence of optical foreign substances since edges are not formed, and by reducing a width of chamfering on a main surface side, an area of actual optical information transmission on the main surface can be kept broad, which greatly contributes to suppression of image deterioration particularly in regard to recent rapid advances in miniaturization of image-taking devices such as video cameras.

Furthermore, in the curve chamfering of the edges of the main surface side, an amount of chamfering on one main surface side may be smaller than an amount of chamfering on another main surface side.

With this configuration, it is possible to identify a front and back of an optical filter using differences between these curvatures, not only visually, but also by sense of touch. It is also possible to perform this identification using a screen recognition device.

A method for manufacturing an optical filter as described above includes a step of cutting a layered optical wafer, which has been formed as a single optical wafer or a plurality of layered optical wafers that can be cut into a plurality of optical plates, into small pieces using a dicing blade so that divided surfaces of the optical wafer are parallel, and a step of curve chamfering the layered optical wafer using a curved surface blade having a curved surface whose curvature corresponds to a required curve at a position of an edge to be curve chamfered. In this configuration, an order of cutting the wafer and curve chamfering is not a concern, and either may be performed first.

When curve chamfering is formed on both surfaces of an optical filter, it is possible to perform curve chamfering on one surface side with predetermined spacing with a blade having a curved surface portion, to then turn the optical filter over and fix it, and to then form curved portions and perform cutting into small pieces after making the required positional adjustments. A blade used for cutting into small pieces is a disk-shaped dicing blade for example, and performs cutting while rotating at high speed.

Furthermore, as another manufacturing method, after a layered optical wafer is formed, a blade is used that is provided with a dicing blade portion with which divided surfaces of the optical wafer become parallel to one another, and a curved surface blade portion that has a curved surface corresponding to a curvature of an edge to be curve chamfered, and the layered optical wafer is cut into small pieces with the dicing blade portion, after which curve chamfering is performed with the curved surface blade portion on an edge of the layered optical wafer that has been cut into small pieces.

With this manufacturing method, since the above-described blade is used, it is possible to perform processes for cutting into small pieces and curve chamfering for edges of an optical filter continuously, which is efficient.

In a further manufacturing method, after a layered optical wafer is formed, the layered optical wafer is cut into small pieces using a dicing blade so that divided surfaces of the optical wafer are parallel, and an edge of the layered optical wafer that has been cut into small pieces is curve chamfered by grinding with a grinding device positioned in a position facing a grinding curved surface corresponding to a curvature to be curve chamfered.

These grinding surfaces positioned on opposite sides may have the same curvature or may have different curvatures. When a spacing of the grinding surfaces is formed matching a thickness of the optical filter, it is possible to perform curve chamfering on two edges in one step. Furthermore, when a configuration is used in which the spacing of the grinding surfaces has a width, thicknesses of the optical filters do not have to be uniform and may be adapted to optical filters of various thicknesses.

Moreover, a storage structure for storing an optical filter according to the present invention is provided with a storage case that has a recess portion for storing the optical filter, wherein an inclined surface is formed at an inner peripheral surface of the recess portion across a side surface and bottom surface therein, and wherein the optical filter is stored in a state in which a curve chamfered portion of the optical filter is in contact with the inclined surface.

With this storage structure, the optical filter is held in a state in which its curve chamfered portions are in contact with inclined surface portions of the storage case, and in this case, since curve chamfering has been performed on the optical filter, edge portions of the optical filter do not make contact in a sharp condition, which allows occurrence of optical foreign substances to be suppressed.

Further still, an optical device according to the present invention is provided with an image-taking element and a package for accommodating the image-taking element, wherein an opening portion is formed in the package, and wherein an optical filter of the present invention is arranged at the opening so as to cover the opening portion.

With an optical device of the above-described configuration, the opening portion of the package is covered by the optical filter, and this optical filter has a usual function of being a light transmission member and is also provided with a sealing function for the package. This optical filter is curve chamfered on its main surface sides and/or its side surface sides, and therefore, as described above, the optical filter itself does not produce chips, and there are almost no optical foreign substances since the optical filter does not cut the package.

BRIEF DESCRIPTION OF THE DRAWINGS

FIGS. 9(a) and 9(b) show yet a further embodiment of an optical filter according to the present invention, with FIG. 9(a) showing a top view of a main surface and FIG. 9(b) showing a side view thereof.

FIG. 10 is a top view showing a main-surface side of yet a further embodiment of an optical filter according to the present invention.

FIG. 11 is a top view showing a main-surface side of yet a further embodiment of an optical filter according to the present invention.

DETAILED DESCRIPTION OF THE PREFERRED EMBODIMENTS

Figure 1:
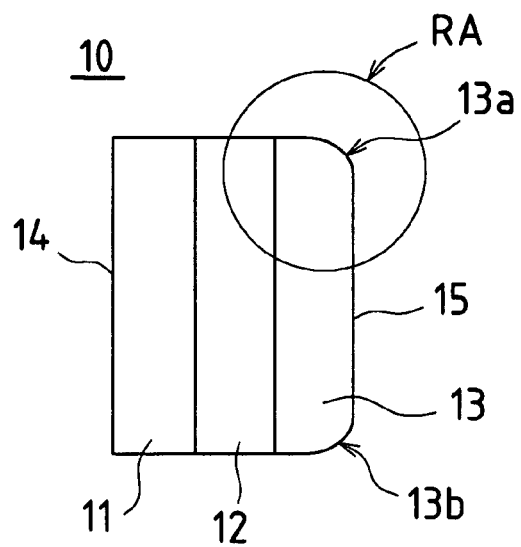
FIG. 1 is a side view showing an embodiment of an optical filter according to the present invention.

First, an embodiment of an optical filter according to the present invention is described using an optical low pass filter as an example with reference to the accompanying drawings. FIG. 1 is a side view showing an embodiment of an optical filter according to the present invention.

Figure 2:
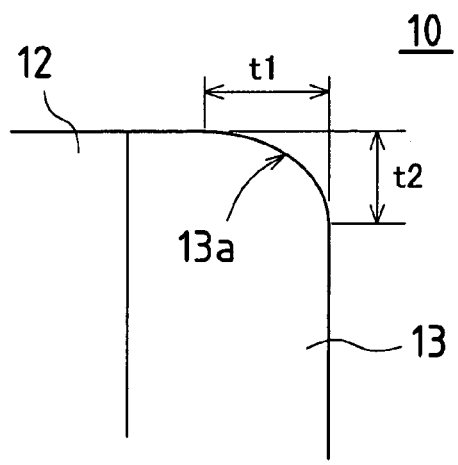
FIG. 2 is an enlarged view of a portion indicated by arrow RA in FIG. 1.

FIG. 2 is an enlarged view of a portion indicated by arrow RA in FIG. 1.

An optical low pass filter 10 is constituted by a quartz birefringent plate 11, a quarter wavelength plate 12, and a quartz birefringent plate 13 layered in that order. The quartz birefringent plates 11 and 13 use a birefringence effect of quartz to output outgoing beams by separating incident light into ordinary rays and extraordinary rays, and a direction and width of these separated beams can be adjusted as appropriate with predetermined parameters. In this way, an optical low pass filter is constituted by combining quartz birefringent plates and the like as appropriate. The quartz birefringent plate 11 is set, for example, to separate rays in a horizontal direction, and has a function of separating incident light in the horizontal direction using a birefringence effect of quartz. Furthermore, an anti-reflection coating 14 is formed on an incident light surface (main surface) of the quartz birefringent plate 14. Although not shown in detail in the drawings, the anti-reflection coating 14 is formed by multi-layering dielectric thin films made of metal oxide films or the like. On the other hand, the quartz birefringent plate 13 is set, for example, to separate rays at a 90 degree angle, and has a function of splitting incident light in a 90 degree direction using a birefringence effect of quartz. Furthermore, an infrared cut coating 15 is formed on an outgoing light surface (main surface) of the quartz birefringent plate 13. Although not shown in detail in the drawings, the infrared cut coating 15 is also formed by multi-layering dielectric thin films.

Curved chamfered portions 13a and 13b are formed at a periphery of the outgoing light surface (main surface) of the quartz birefringent plate 13. As shown in FIGS. 1 and 2, this curved chamfering is a formation in which edge portions are chamfered to a curved condition, and chamfering of a main surface-side edge is configured with a predetermined curvature so that an amount of chamfering on the main surface-side edge is less than the amount of chamfering on a side surface-side edge. That is, chamfering width t2 on the main surface-side shown in FIG. 2 is shorter than chamfering width t1 on the side surface side. With such a configuration, since edges are not formed as compared with conventional straight chamfering, occurrence of optical foreign substances caused by cracking or chipping of the optical filter can be reduced, and it is also possible to greatly inhibit occurrence of optical foreign substances caused by edge portions cutting into a packaging case or the like. Moreover, by reducing the width of chamfering on the main surface side, an area of actual optical information transmission on the main surface can be kept broad, thus reducing loss of optical information. The present invention can suppress image deterioration particularly with regard to recent rapid advances in miniaturization of image-taking devices such as video cameras.

Figure 3:
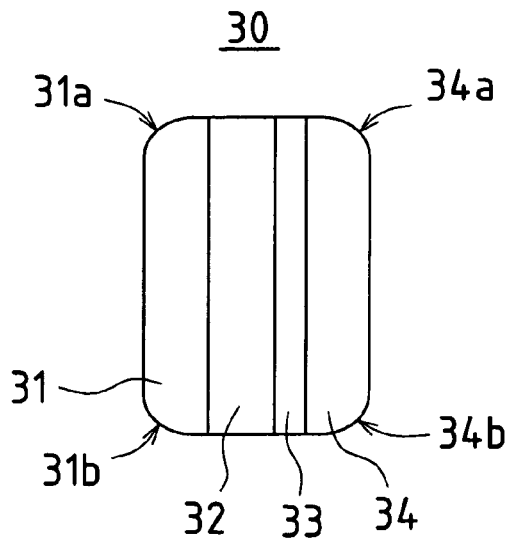
FIG. 3 is a side view showing another embodiment of an optical filter according to the present invention.

The above embodiment described a configuration in which only one main surface was curve chamfered, but an optical low pass filter 30, as shown in FIG. 3, in which both main surfaces are curve chamfered is also possible. The optical low pass filter 30 is constituted by a birefringent plate 31, an infrared cut filter 32, a phase difference plate 33, and a birefringent plate 34 layered in that order, with curve chamfering performed on the birefringent plates 31 and 34, which are positioned as two main surfaces of the optical low pass filter 30, thus forming curve chamfered portions 31a, 31b, 34a, and 34b.

Figure 4:
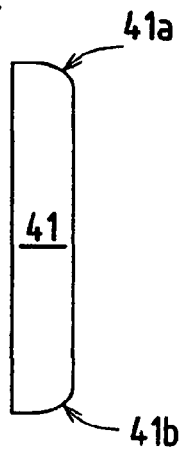
FIG. 4 is a side view showing a further embodiment of an optical filter according to the present invention.
Figure 5:
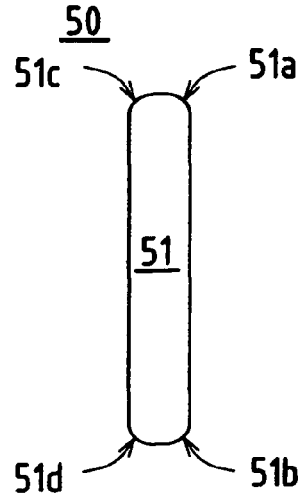
FIG. 5 is a side view showing yet a further embodiment of an optical filter according to the present invention.

Furthermore, optical low pass filters 40 and 50 shown in FIGS. 4 and 5 are each constituted by a single optical plate 41 and 51. The optical low pass filter 40 is configured with curve chamfered portions 41a and 41b formed on one main surface side, and the optical low pass filter 50 is configured with curve chamfered portions 51a, 51b, 51c, and 51d formed on both main surface sides.

Figure 6:
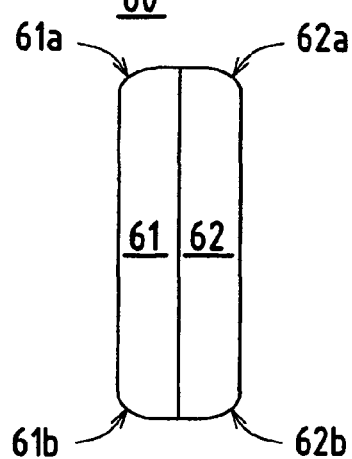
FIG. 6 is a side view showing yet a further embodiment of an optical filter according to the present invention.

Moreover, as shown in FIG. 6, an optical low pass filter 60 is formed with two layered optical plates 61 and 62, and may have curve chamfered portions 61a, 61b, 62a, and 62b formed on both main surface sides.

Figure 7:
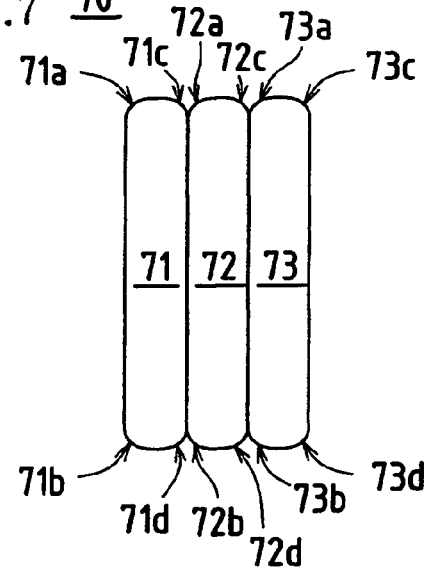
FIG. 7 is a side view showing yet a further embodiment of an optical filter according to the present invention.

Also, as shown in FIG. 7, an optical low pass filter 70 is formed with three layered optical plates 71, 72, and 73, and may have curve chamfered portions 71a to 71d, 72a to 72d, and 73a to 73d formed on both main surface sides of each of the optical plates 71, 72, and 73.

Figure 8A:
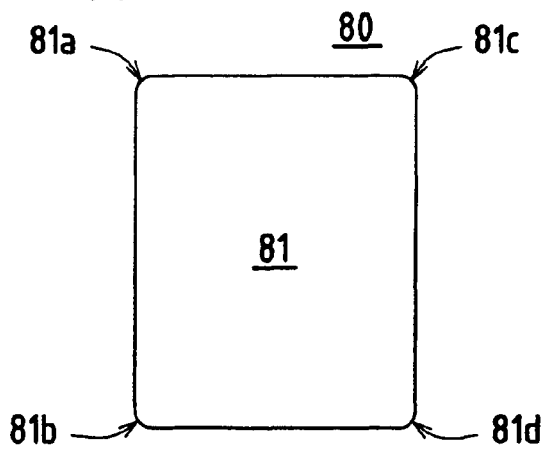
FIGS. 8(a) and 8(b) show yet a further embodiment of an optical filter according to the present invention, with FIG. 8(a) showing a top view of a main surface and FIG. 8(b) showing a side view thereof.
Figure 8B:
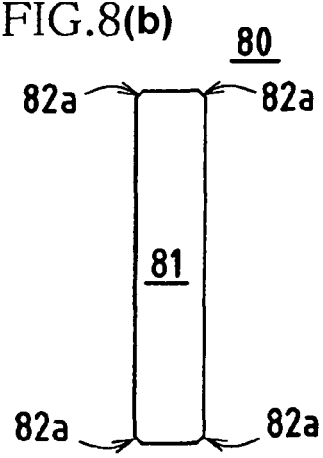

And moreover, similar to FIGS. 4 and 5, an optical low pass filter 80 as shown in FIG. 8 is made of a single optical plate 81. Curve chamfering is performed on side surface sides, thereby forming curve chamfered portions 81a to 81d. And very finely chamfered portions 82a are formed on a main surface side.

As a configuration in which curve chamfering is performed on the side surface sides, there is also a configuration in which curve chamfering is also performed on the main surface side, as shown in FIGS. 9(a) and 9(b). An optical low pass filter 90 is made of a single optical plate 91, with curve chamfered portions 91a to 91d on the side surface sides and curve chamfered portions 91e to 91h on the main surface sides, so that the optical low pass filter 90 has no edges on any surface, and is thus a configuration which has the least contact-related damage.

It should be noted that, although not shown in the drawings, optical filters made of one or a plurality of optical plates according to the present invention may also be configured so that curve chamfering is performed on a side surface and one main surface side.

Any of the optical filters according to the present invention may be provided as required with an infrared cut coating or an anti-reflection coating or the like on a main surface of an optical plate.

The optical filters according to the present invention have been created focusing on a perspective of a shape of the optical filters, such that any impact at a time of contact is reduced in order to inhibit occurrence of optical foreign substances, but since a nature of a surface itself can be thought of as a cause of optical foreign substances that must be overcome in order to further inhibit occurrence of optical foreign substances, it is preferable to apply the present invention after making considerations as appropriate to the nature of the surface.

Furthermore, as shown in the configurations of the optical filters shown in FIGS. 1 through 11, it is preferable that flat areas are formed on the side surfaces or that flat areas are left there when curve chamfering is performed. A basis for this is explained using a comparison with a case of all side surfaces being formed as round shapes. First, a micrometer or the like is used when measuring outer dimensions, and such dimensional measurements become difficult when all side surfaces are formed as round shapes, and thus there is an advantage of ease of measurement when flat areas are formed on the side surfaces. Moreover, when all side surfaces are formed as round shapes, it is necessary to prepare diamond wheels with different radial dimensions for diamond wheels used in curve chamfering processes and grinding processes in accordance with a thickness of a workpiece (optical plate). In contrast to this, even when there are differences in thicknesses of the workpiece (optical plate), it is possible to use the same single diamond wheel of a radial dimension that can be used for all the flat areas, thus increasing a range over which tools can be used in manufacturing.

Furthermore, it is possible to clearly indicate a separation direction of incident light on a birefringent plate by varying widths of curve chamfering.

For example, with an optical filter 100 shown in FIG. 10, it is possible to clearly indicate a direction of light separation by making curve chamfered portions 104 and 105, which are curve chamfered edges of opposing sides, larger than curve chamfered portion 103 (t4=t5, t4>t3). Moreover, with an optical filter 110 shown in FIG. 11, it is possible to clearly indicate a direction of light separation by making curve chamfered portion 114, which is a wide curve chamfered edge of one side, larger than curve chamfered portion 113 (t6<t8<t7).

Figure 12:
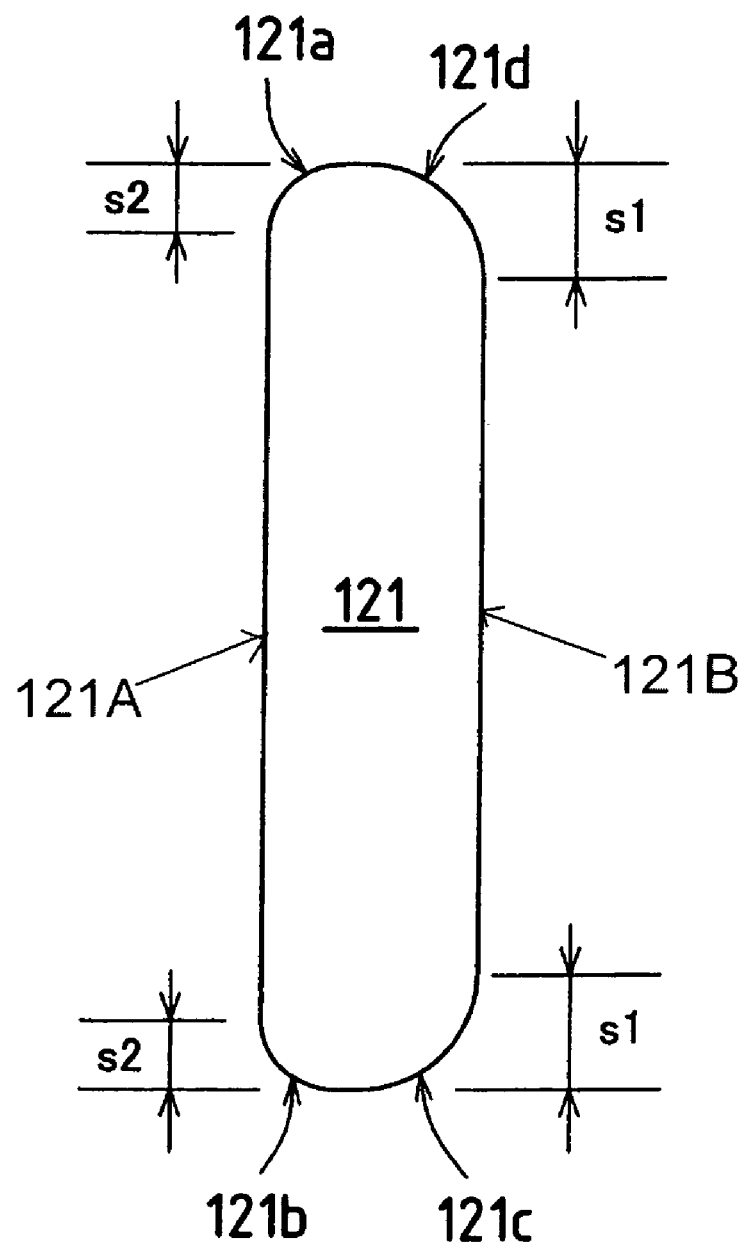
FIG. 12 is a side view showing yet a further embodiment of an optical filter according to the present invention.

As a configuration in which a width of curve chamfering is varied, an optical filter 120 as shown in FIG. 12 is possible in which an amount of curve chamfering on edges of one main surface side is smaller than an amount of curve chamfering on edges of another main surface side. In the present embodiment, curve chamfering is performed respectively on four edges of each main surface. The following is a description of the present embodiment based on the accompanying drawings.

With the optical filter 120, curve chamfered portions 121a and 121b of edges of a main surface 121A of the optical plate 121 are chamfered to have an equivalent curvature. On the other hand, curve chamfered portions 121c and 121d of edges of a main surface 121B are chamfered to have an equivalent curvature and so as to have a different curvature from the curve chamfered portions 121a and 121b of the edges of the main surface 121A. In this embodiment, chamfering width s2 of the edges of the main surface 121A is smaller than chamfering width s1 of the edges of the main surface 121B (s2<s1).

With the optical filter 120 it is possible to identify a front and back of the optical filter 120, not only visually, but also by sense of touch. It is also possible to perform this identification using a screen recognition device. In a coating process that will be discussed later below, it is necessary to apply a coating to only one main surface on one side, and in this case it is extremely important to be able to perform front and back identification accurately and with ease. And because such identification is particularly difficult when optical filters are thin, by using different amounts of chamfering for one main surface and the other main surface as in the present configuration, that is, by making a curvature of the curve chamfering performed on each main surface different, it is easy to identify the front and back of the optical filter.

The following is a description of a method for manufacturing an optical filter according to the present invention.

Figure 13:
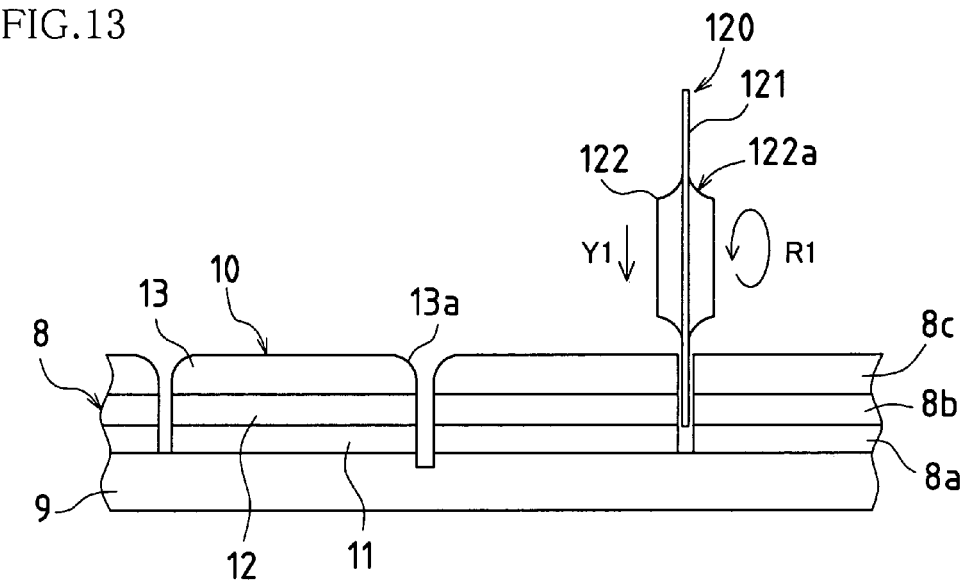
FIG. 13 is a diagram illustrating an embodiment of a method for manufacturing an optical filter according to the present invention.

As mentioned earlier, a multi-cutout manufacturing method has often been used in recent years from a point of view of reducing manufacturing costs. FIG. 13 shows an embodiment in which a method for manufacturing an optical filter according to the present invention has been applied in a multi-cutout manufacturing method.

In the multi-cutout manufacturing method, at a stage before a wafer is cut into small pieces, necessary structural members are laminated according to required wave-filtering characteristics. That is, an optical filter wafer 8 can be obtained, for example, by bonding in order a quarter wavelength plate wafer 8b and a birefringent plate wafer 8c, which separates light perpendicularly, on a birefringent plate wafer 8a, which separates light horizontally.

Next, the optical filter wafer 8 is cut into predetermined small pieces by a blade 120 while, for example, the wafer is temporarily fixed on a support stand 9 by an adhesive. The blade 120 used is a disk-shaped dicing blade. As shown in FIG. 13, viewed in cross section, the blade 120 has a small width and is provided with a chamfering blade portion 122 that has a parallel cutting portion 121, a planar shape of which is circular, and a curved surface portion 122a, which is formed at an inner portion of this circular shape. The curved surface portion 122a is formed with a curved surface in accordance to a curvature required to chamfer edge portions of the optical filter to a predetermined curvature. Slicing (arrow Y1) is performed to a depth proximal to a tip portion of the curved surface portion 122a while rotating (arrow R1) the blade 120 at high speed to cut the optical filter wafer 8 into a matrix shape. In this way, cut surfaces of the wafer become side surfaces of the optical filter 10, and a curve chamfered portion 13a is formed on one main surface side of the optical filter 10. After this, the adhesive is dissolved, and individual optical filters 10 are separated. It should be noted that a shape of curve chamfering can be controlled using a shape of the curved surface portion 122a of the blade 120.

Furthermore, as shown in FIG. 2 for example, in regard to chamfering of edges of a main surface, when a chamfering width of a main surface side is smaller than a chamfering width of a side surface side, a radial length of the blade 120 becomes relatively longer due to the shape of the curved portion 122a, and the curved portion 122a as a whole is a sharp shape along the parallel cutting portion 121.

Figure 14:
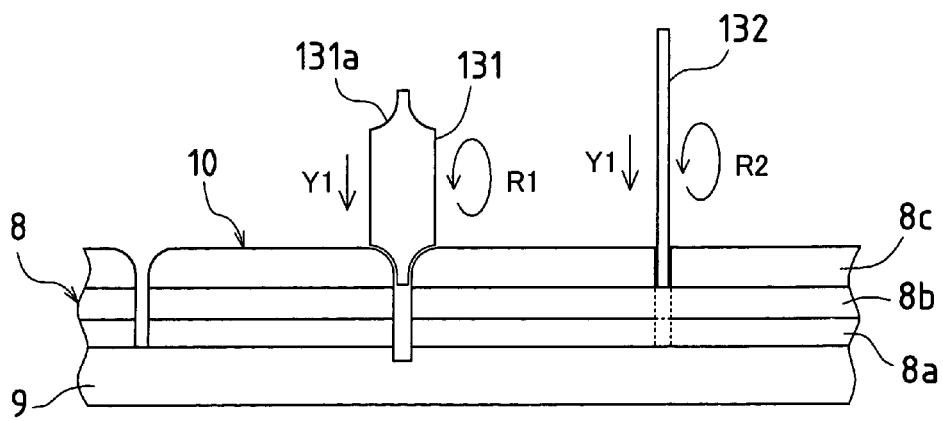
FIG. 14 is a diagram illustrating an embodiment of another method for manufacturing an optical filter according to the present invention.

FIG. 14 is a diagram for describing another embodiment of a method for manufacturing an optical filter according to the present invention.

A step cutting method is employed in this embodiment using two types of blades as shown in FIG. 14.

First, as in the previous embodiment, at a stage before a wafer is cut into small pieces, necessary structural members are laminated according to required wave-filtering characteristics. That is, optical filter wafer 8 can be obtained by bonding in order quarter wavelength plate wafer 8b and birefringent plate wafer 8c, which separates light perpendicularly, on birefringent plate wafer 8a, which separates light horizontally.

Next, the optical filter wafer 8 is cut into predetermined small pieces by a flat blade 132 while the wafer is adhered to support stand 9 by an adhesive. The blade used is a disk-shaped dicing blade and, as shown in FIG. 14, when viewed in cross section, the blade is made of only a fine-width parallel cutting portion. Edge portions of optical filter 10 are chamfered to a predetermined curvature with a chamfering blade 131. The chamfering blade 131 used in this process is formed with a curvature corresponding to an applicable curvature. After this, the adhesive is dissolved, and individual optical filters 10 are separated from the support stand 9. Curve chamfering is performed after cutting into small pieces in this manufacturing method, but it is also possible to first perform curve chamfering using the chamfering blade 131 and then to perform cutting into small pieces using the flat blade 132.

Furthermore, it is also possible to set in advance a spacing between these blades and perform parallel cutting with a predetermined spacing after adjusting the blades to a required height (slicing depth adjustment).

Moreover, it is also possible to perform cutting by a multi-blade configuration with the same type of blades positioned in parallel.

The present embodiment was described using a case in which curve chamfering was performed on only one surface of the optical filter, but when manufacturing optical filters such as those shown in FIGS. 3, 5, 6, 7, and 9, or when manufacturing optical filters of a configuration in which chamfered portions are formed on both main surfaces of an optical plate, a method can be executed in which curve chamfering is performed on one main surface by cutting a portion of optical filter wafer 8 with the chamfering blade 131 used in the manufacturing method shown in FIG. 14 for example, then turning the optical filter wafer 8 over and adhesively fixing it and performing curve chamfering again by cutting with the blade 120 used in FIG. 13 after making required positional adjustments.

Figure 15:
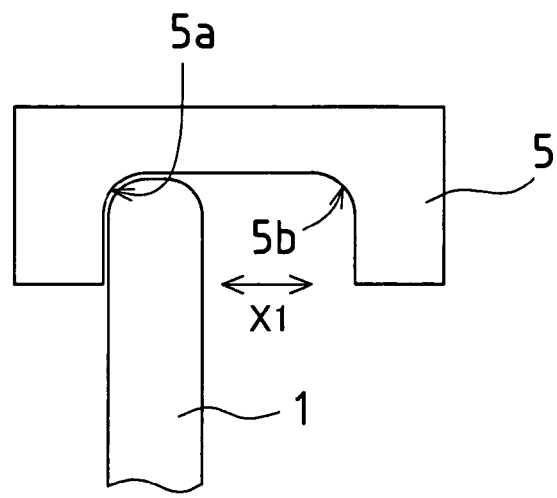
FIG. 15 is a diagram illustrating a grinding device used in a method for manufacturing an optical filter according to the present invention.

In the above-described manufacturing method, it is also possible to use a grinding tool 5 as shown in FIG. 15 when performing curve chamfering on edges of an optical filter. The grinding tool 5 is formed so that a cross section of a diamond wheel for performing curve chamfering on edges of optical filter 1 has a U-shaped grooved surface, and is configured so that opposite curved surfaces 5a and 5b are ground to a predetermined curvature. The grinding tool 5 is provided with a grinding surface that has the same curvature.

Grinding is performed in this grinding process by bringing the curved surface 5a or 5b of the grinding tool into contact with a predetermined surface of the optical filter 1. It is possible to move the optical filter 1 in a direction of arrow X1, and a thickness of the optical filter 1 can be adapted to various widths within a distance in which movement is possible, which offers better usability since a width b can be applied to a thickness of the optical filter 1 to be curve chamfered.

Figure 16:
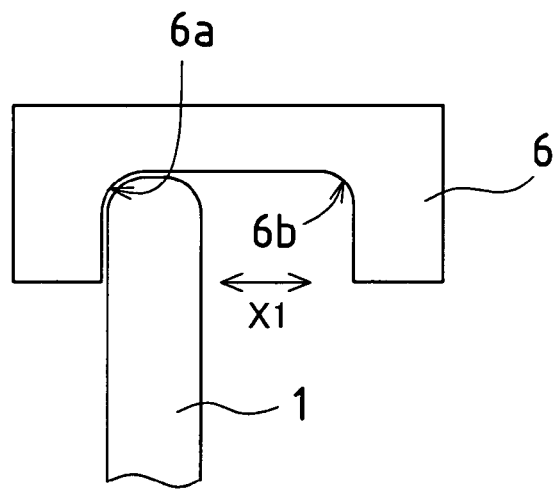
FIG. 16 is a diagram for describing another grinding device used in a method for manufacturing an optical filter according to the present invention.

Furthermore, when it is desired to vary a curve of opposite curved surfaces, it is possible to use a grinding tool 6 that has curved surfaces 6a and 6b with different curvatures as shown in FIG. 16. Also in this case, grinding can be performed with the same method as in FIG. 15.

Figure 17:
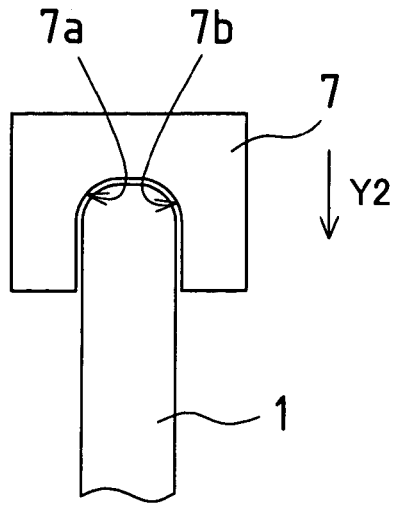
FIG. 17 is a diagram for describing a further grinding device used in a method for manufacturing an optical filter according to the present invention.

Furthermore, when not curve chamfering in order on each edge by moving the optical filter as shown in FIG. 15 or FIG. 16, but instead performing curve chamfering simultaneously on edges of both main surfaces, it is possible to use a grinding tool 7 as shown in FIG. 17 for example. As in FIGS. 15 and 16, this grinding tool 7 is formed with a diamond wheel forming a grooved surface, a cross section of which is U-shaped. A width into which an optical filter to be curve chamfered can be fit into the grinding tool 7 is a point of difference between the grinding tool 7 and the grinding tools 5 and 6. The U-shaped curved grinding surface is moved in a direction of arrow Y2 so that optical filter 1 is fit into it and curve chamfering is performed. Curve chamfering of both main surfaces can be performed simultaneously when using the grinding tool 7, which makes this tool superior in terms of operational efficiency.

After an optical filter has been cut into small pieces and undergone peripheral processing (curve chamfering) of the methods shown in FIGS. 13 through 17, portions of side surfaces of the optical filter that have been made rough are smoothened by wet etching after rinsing. An etching solution used in this process is a mixed solution of ammonium fluoride, hydrofluoric acid, and the like. Rinsing is performed after this process, then thicknesses of main surfaces are adjusted to a predetermined thickness with a secondary grinding process. After further rinsing, the main surfaces of the optical filter are given a mirror finish by performing a polishing-grinding process. Then, after further rinsing, a main surface that is to become an optical surface is given a coating film. When main surface sides of the optical filter are given different curvatures with curve chamfering as shown in FIG. 12 for example, it is easy to identify the main surface for coating in this process, which is another advantage of a configuration in which chamfering for curves are varied.

The following is a description of a configuration for storing an optical filter according to the present invention manufactured by the above-described manufacturing method.

Figure 18:
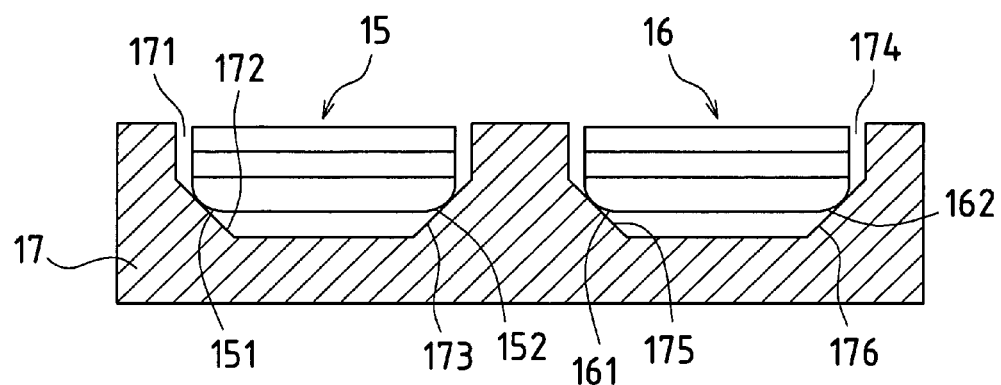
FIG. 18 is a cross section of a storage structure for an optical filter according to the present invention.

Since an optical filter is stored in a case in a condition in which a surface for incoming optical information is exposed, it is necessary to thoroughly eliminate optical foreign substances. FIG. 18 is a cross section of a storage structure in which optical filters 15 and 16 are stored in a storage case 17.

The storage case 17 has storage recess portions 171 and 174 for storing the optical filters 15 and 16. Inclined surface portions 172 and 173 (175 and 176) are incorporated continuously in a base peripheral portion of each storage recess portion 171 (174). Curve chamfered portions 151 and 152

(161 and 162) formed respectively on one main surface side of the optical filter 15 (16) are brought into contact respectively with the inclined surface portions 172 and 173 (175 and 176) and are horizontally mounted and stored in the storage case 17 in this state. With this storage structure, storage is achieved without any acute angle contact between the curve chamfered portions 151 and 152 (161 and 162) of the optical filter 15 (16) and the inclined surface portions 172 and 173 (175 and 176) of the storage case 17, thus enabling suppression of optical foreign substances caused by contact with the storage case 17.

Figure 19:
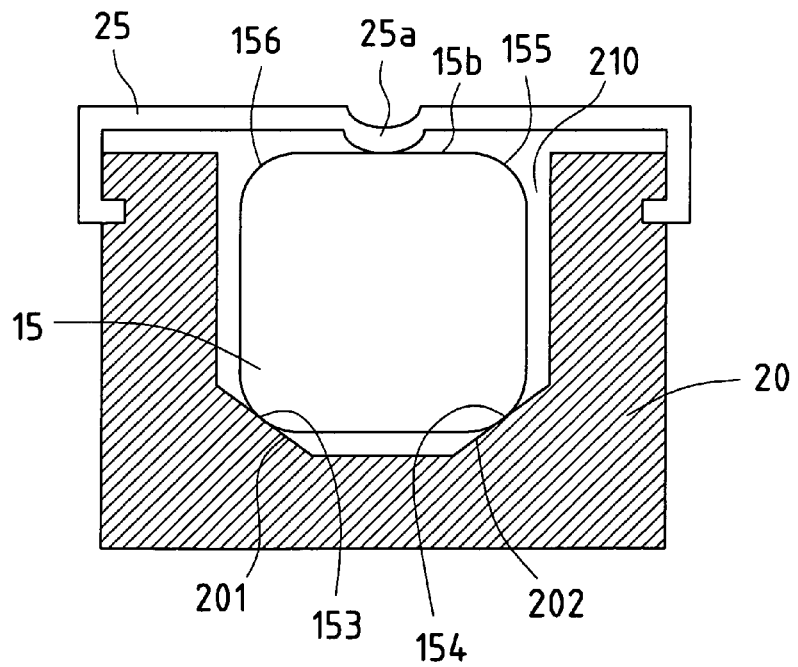
FIG. 19 is a cross section of a further storage structure for an optical filter according to the present invention.

This storage structure is an embodiment in which the optical filters are laid flat with their main surface facing up, but the following is a description of yet another embodiment in which an optical filter is stood on its side surface portions as shown in FIG. 19.

As in the above-described embodiment, a storage recess portion 210 is formed in this storage structure for storing optical filter 15 in a storage case 20. Inclined surface portions 201 and 202 are formed in a peripheral base portion of the storage recess portion 210. The optical filter 15, side surface edges of which are chamfered to form curve chamfered portions 153, 154, 155, and 155, is stood on its side surface portions for storage in the storage recess portion 210. That is, the curve chamfered portions 153 and 154 are respectively held by being brought into contact with the inclined surface portions 201 and 202 of the storage case 20. With this storage structure too, storage is achieved without any acute angle contact between the curve chamfered portions 153 and 154 of the optical filter 15 and the inclined surface portions 201 and 202 of the storage case 20, thus enabling suppression of optical foreign substances caused by contact with the storage case 20.

Moreover, a press-down plate 25 may be latched and fixed to the storage case 20 to stably hold the optical filter 15. A pressing portion 25a is provided at the press-down plate 25 and presses an upper side surface 15a of the optical filter 15 while the filter is fixed. The pressing portion 25a is formed as a curved surface and is made of a material that has cushioning properties. Accordingly, when the press-down plate 25 is fixed to the storage case 20, the pressing portion 25a causes no damage to the optical filter 15.

In the above-described storage structure, it is also possible that a structure of the inclined surface portions of the storage case do not have a constant inclined surface, but rather have a concave curvature or a convex curvature for example.

It should be noted that the present embodiment was described for a storage case having two storage recess portion holes, but it is also possible to use a storage case in which a multitude of storage recess portions are formed in a matrix shape, and it is also possible to use a configuration in which multiple tiers of such storage cases are stacked.

Figure 20:
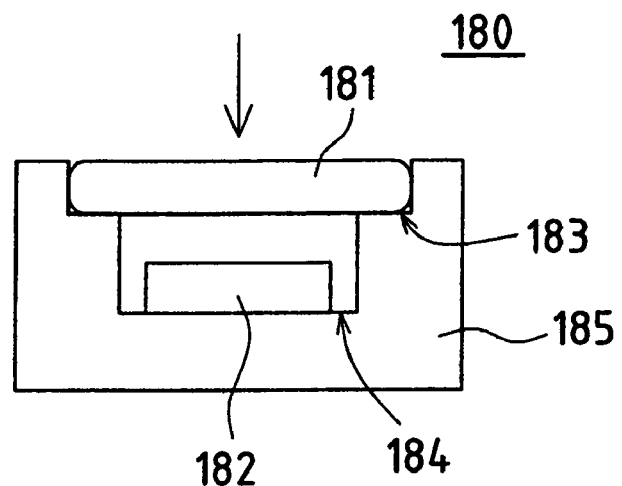
FIG. 20 is a view of an overall configuration of an image-taking device in which an optical filter according to the present invention is used.
Figure 21:
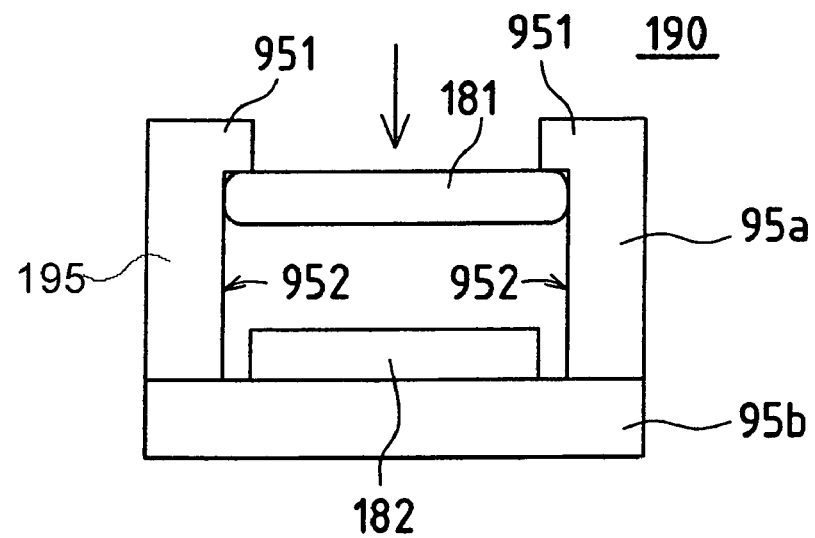
FIG. 21 is a view of an overall configuration of another image-taking device in which an optical filter according to the present invention is used.

When used in an image-taking device, since the optical filter according to the present invention has no edges after undergoing curve chamfering as described above, chips or other debris of the optical filter are not produced, and therefore there are almost no optical foreign substances produced from the optical filter itself. Furthermore, this enables occurrence of optical foreign substances due to cutting of the CCD package by the optical filter to be suppressed. FIGS. 20 and 21 are views of overall configurations of examples of image-taking devices in which optical filters according to the present invention are used.

An image-taking device 180 shown in FIG. 20 is provided with a CCD package 185 made of ceramic, and a CCD 182 is mounted in a recess portion provided in the CCD package 185 so that an opening portion of the recess portion is covered by an optical filter 181. The optical filter 181 is mounted on a step 183 provided on an inside surface of the recess portion. The optical filter 181 is configured such that both main surface sides and side surface sides have undergone curve chamfering. Accordingly, as described above, the optical filter 181 is prevented from producing chips or other debris, and since there is no cutting of the CCD package 185 by the optical filter 181, there are almost no optical foreign substances produced. Moreover, since the opening portion of the recess portion is covered by the optical filter 181, this also performs a role of providing the CCD package 185 with sealing properties.

Furthermore, a configuration of a CCD package 195 of an image-taking device 190 shown in FIG. 21 is different from the configuration shown in FIG. 20. The CCD package 195 is formed with members 95a forming a side wall attached to a member 95b, which forms a base portion. Upper portions of the members 95a are formed with protruding portions 951 that protrude inward so as to enclose an opening portion of the CCD package 195. Optical filter 181 is fixed with an adhesive to inner sides of the protruding portions 951 as well as to side surfaces 952 of the members 95a, and this also performs a role of providing CCD package 195 with sealing properties.

As described above, due to continued miniaturization of image-taking devices such as video cameras, a distance between a CCD and an optical filter has been becoming shorter in recent years, so that adherence of optical foreign substances to the optical filter has become an even worse image defect. An optical filter according to the present invention is superior in that it solves this issue and is beneficial as a structure that thoroughly eliminates occurrence of optical foreign substances. A method by which optical filters of this structure can be manufactured is also beneficial and, from a perspective of being able to maintain quality of such a high quality optical filter, a structure can be provided for storing a thus-manufactured optical filter.

The invention claimed is:

1. An optical filter comprising one or a plurality of optical plates, the optical filter having a first main surface, a second main surface, and a plurality of side surfaces connecting the first main surface and the second main surface,
   wherein a side surface edge formed by adjacent side surfaces of the optical filter is chamfered with a curvature to form a curved chamfered portion,
   wherein a first main surface edge formed by the first main surface and at least one of the side surfaces of the optical filter is chamfered with a curvature to form a curved chamfered portion, and
   wherein, at the first main surface edge, a width of the curved chamfered portion along the first main surface is less than a width of the curved chamfered portion along each of the at least one of the side surfaces.

2. An optical filter according to claim 1, wherein a second main surface edge formed by the second main surface and at least one of the side surfaces of the optical filter is chamfered with a curvature to form a curved chamfered portion.

3. An optical filter comprising a plurality of optical plates, each of the optical plates having a first main surface, a second main surface, and side surfaces connecting the first main surface and the second main surface,
   wherein a side surface edge of a first optical plate formed by adjacent side surfaces of the first optical plate is chamfered with a curvature to form a curved chamfered portion,
   wherein a first main surface edge formed by the first main surface of the first optical plate and at least one of the side surfaces of the first optical plate is chamfered with a curvature to form a curved chamfered portion, and wherein, at the first main surface edge, a width of the curved chamfered portion along the first main surface is less than a width of the curved chamfered portion along each of the at least one of the side surfaces.

4. An optical filter according to claim 3, wherein a second main surface edge formed by the second main surface of the first optical plate and at least one of the side surfaces of the first optical plate is chamfered with a curvature to form a curved chamfered portion at a periphery of the second main surface.

5. An optical filter comprising one or a plurality of optical plates, the optical filter having a first main surface, a second main surface, and one or more side surfaces connecting the first main surface and the second main surface,
wherein a first main surface edge formed by the first main surface and at least one side surface of the optical filter is chamfered with a curvature to form a curved chamfered portion at a periphery of the first main surface,
wherein a second main surface edge formed by the second main surface and at least one side surface of the optical filter is chamfered with a curvature to form a curved chamfered portion at a periphery of the second main surface, and
wherein a width of the curved chamfered portion along the first main surface at the first main surface edge is smaller than a width of the curved chamfered portion along the second main surface at the second main surface edge.

6. An optical filter according to claim 5, wherein the one or more side surfaces comprise three or more side surfaces.

7. An optical filter comprising one or a plurality of optical plates, said optical filter having a first main surface, a second main surface, and side surfaces connecting the first main surface and the second main surface,
wherein a side surface edge formed by adjacent side surfaces of the optical filter is chamfered with a curvature to form a curved chamfered portion,
wherein a first main surface edge formed by the first main surface and at least one of the side surfaces of the optical filter is chamfered with a curvature to form a curved chamfered portion at a periphery of the first main surface,
wherein a second main surface edge formed by the second main surface and at least one of the side surfaces of the optical filter is chamfered with a curvature to form a curved chamfered portion at a periphery of the second main surface, and
wherein a width of the curved chamfered portion along the first main surface at the first main surface edge is smaller than a width of the curved chamfered portion along the second main surface at the second main surface edge.

8. An optical filter comprising a plurality of optical plates, each of the optical plates having a first main surface, a second main surface, and one or more side surfaces connecting the first main surface and the second main surface,
wherein a first main surface edge formed by the first main surface of a first optical plate and at least one side surface of the first optical plate is chamfered with a curvature to form a curved chamfered portion at a periphery of the first main surface of the first optical plate,
wherein a second main surface edge formed by the second main surface of the first optical plate and at least one side surface of the first optical plate is chamfered with a curvature to form a curved chamfered portion at a periphery of the second main surface of the first optical plate, and
wherein a width of the curved chamfered portion along the first main surface at the first main surface edge is smaller than a width of the curved chamfered portion along the second main surface at the second main surface edge.

9. An optical filter according to claim 8, wherein the one or more side surfaces comprise three or more side surfaces.

10. An optical filter comprising a plurality of optical plates, each of the optical plates having a first main surface, a second main surface, and one or more side surfaces connecting the first main surface and the second main surface,
wherein a side surface edge of a first optical plate formed by adjacent side surfaces of the first optical plate is chamfered with a curvature to form a curved chamfered portion,
wherein a first main surface edge formed by the first main surface of the first optical plate and at least one of the side surfaces of the first optical plate is chamfered with a curvature to form a curved chamfered portion at a periphery of the first main surface,
wherein a second main surface edge formed by the second main surface of the first optical plate and at least one of the side surfaces of the first optical plate is chamfered with a curvature to form a curved chamfered portion at a periphery of the second main surface, and
wherein a width of the curved chamfered portion along the first main surface at the first main surface edge is smaller than a width of the curved chamfered portion along the second main surface at the second main surface edge.

* * * * *